US007833918B2

(12) United States Patent
Gormley et al.

(10) Patent No.: US 7,833,918 B2
(45) Date of Patent: Nov. 16, 2010

(54) WATER-ACTIVATED, DISPOSABLE TWO-SIDED CLEANING ARTICLE

(75) Inventors: Deirdre M. Gormley, Idaho Falls, ID (US); Priti Das, Tempe, AZ (US); Aleidatje M. Lester, Mesa, AZ (US); Kevin Hafer, Chandler, AZ (US)

(73) Assignee: The Dial Corporation, Scottsdale, AZ (US)

( * ) Notice: Subject to any disclaimer, the term of this patent is extended or adjusted under 35 U.S.C. 154(b) by 0 days.

(21) Appl. No.: 12/353,841

(22) Filed: Jan. 14, 2009

(65) Prior Publication Data

US 2010/0175209 A1 Jul. 15, 2010

(51) Int. Cl.
*B32B 27/02* (2006.01)

(52) U.S. Cl. ....................... 442/171; 442/170; 442/402; 442/403

(58) Field of Classification Search ................. 442/164, 442/170, 171, 123, 128, 381, 388
See application file for complete search history.

(56) References Cited

U.S. PATENT DOCUMENTS

| | | | | |
|---|---|---|---|---|
| 3,338,992 | A | 8/1967 | Kinney | |
| 3,341,394 | A | 9/1967 | Kinney | |
| 3,502,763 | A | 3/1970 | Hartmann | |
| 3,542,615 | A | 11/1970 | Dobo et al. | |
| 3,692,618 | A | 9/1972 | Dorschner et al. | |
| 3,788,999 | A | 1/1974 | Abler | |
| 3,802,817 | A | 4/1974 | Matsuki et al. | |
| 3,849,241 | A | 11/1974 | Butin et al. | |
| 4,145,302 | A | 3/1979 | Doan | |
| 4,189,395 | A | 2/1980 | Bland | |
| 4,340,563 | A | 7/1982 | Appel et al. | |
| 4,446,032 | A | 5/1984 | Munteanu et al. | |
| 4,464,271 | A | 8/1984 | Munteanu et al. | |
| 4,640,810 | A | 2/1987 | Laursen et al. | |
| 5,382,400 | A | 1/1995 | Pike et al. | |
| 5,507,968 | A | 4/1996 | Palaikis | |
| 5,866,488 | A | 2/1999 | Terada et al. | |
| 5,885,516 | A | 3/1999 | Christensen | |
| 6,142,398 | A | 11/2000 | Shefer et al. | |
| 6,147,046 | A | 11/2000 | Shefer et al. | |
| 6,551,980 | B1 | 4/2003 | Wisniewski et al. | |
| 6,573,204 | B1 * | 6/2003 | Philipp et al. | 442/346 |
| 6,573,232 | B1 | 6/2003 | Thomas et al. | |
| 6,689,242 | B2 | 2/2004 | Bodaghi | |
| 6,794,353 | B2 | 9/2004 | Thomas et al. | |
| 7,119,057 | B2 | 10/2006 | Popplewell et al. | |
| 7,122,512 | B2 | 10/2006 | Brain et al. | |
| 7,125,835 | B2 | 10/2006 | Bennet et al. | |
| 7,196,049 | B2 | 3/2007 | Brain et al. | |
| 7,232,794 | B2 * | 6/2007 | Huyhn et al. | 510/438 |
| 7,294,612 | B2 | 11/2007 | Popplewell et al. | |
| 7,338,928 | B2 | 3/2008 | Lau et al. | |
| 2005/0164901 | A1 * | 7/2005 | Foley et al. | 510/438 |
| 2006/0240223 | A1 * | 10/2006 | Tuman et al. | 428/143 |

* cited by examiner

*Primary Examiner*—Lynda Salvatore
(74) *Attorney, Agent, or Firm*—Paul A. Pappalardo

(57) ABSTRACT

A substantially dry, water-activated cleaning article is described that comprises a two-layer nonwoven substrate impregnated with a cleaning composition minimally comprising a nonionic surfactant and a microbially-derived polysaccharidic polymer.

15 Claims, No Drawings

WATER-ACTIVATED, DISPOSABLE TWO-SIDED CLEANING ARTICLE

FIELD OF THE INVENTION

The present invention relates to a disposable cleaning article for cleaning hard surfaces and, more particularly, to articles comprising a substantially dry, two-sided nonwoven substrate impregnated with a long-lasting detergent composition. The invention also relates to methods of manufacturing such articles.

BACKGROUND OF THE INVENTION

Cleaning articles impregnated with detergent are well known and have existed in the household cleaning market for ages. The most familiar and perhaps the oldest of these products is the steel wool pad having a soap core. More recent inventions include "pre-moistened" articles such as the popular and convenient hard surface disinfecting cleaning wipes along with many personal cleansing products. Other cleaning, personal cleansing, or scrubbing articles may be substantially dry rather than pre-moistened, (i.e. the cleaning composition is dried and impregnated within the article), in which case the consumer wets the product prior to use. These are often referred to as "water-activated" articles. Many recent cleaning articles have appeared that are used in conjunction with a mop handle/tool for floor cleaning.

One problem that has persisted with detergent-impregnated metal wools, synthetic pads, sponges, scrubbing articles, and the like, is maximizing the length-of-life of the detergent expressed from the cleaning article throughout multiple cleaning tasks while still delivering an efficacious level of detergent from the article for any single cleaning task at hand. To maximize consumer acceptance, a detergent-impregnated cleaning article should last for at least a few cleaning chores before the detergent is gone and the pad disposed of. This is important even for "disposable articles" since it is unlikely that a consumer will use the product for one small task (e.g., cleaning one bathroom sink) prior to its disposal. It is more likely that a consumer will wet the article and use it for multiple cleaning tasks, such as cleaning dual sinks, the shower and the tub within a bathroom, and will expect the cleaning article to keep delivering detergent during this multiple task cleaning session.

To this end, researchers in this field have included polymeric additives to extend the life of the detergent in the article through multiple uses. Their efforts seem to be more empirical rather than theoretical, since there seems to be little thought given to chemical structures and the possibility of "binding" detergent ingredients to the fibers of the scrubbing article. Polymeric additives, selected only empirically as "thickeners", may need to be incorporated at high levels to have any effect on extending the life of the detergent, and may actually reduce overall detergency of the composition. At the very least, some polymers are expensive additives that should be added sparingly.

For example, U.S. Pat. No. 3,788,999 to Abler claims a long-life sudsing blend for use in a scrubbing pad that comprises a hydrophilic proteinaceous colloidal agglutinant such as gelatin or casein. The amount of this material must be at least 6% by weight. The disclosure notes that for even longer detergent life, up to 50% by weight may be included at which point no further improvement is noted.

U.S. Pat. No. 4,145,302 to Doan claims a detergent pad with longer lasting detergency made possible by simply choosing less water-soluble detergent ingredients. For example, the compositions described in '302 may include the less soluble calcium dodecylbenzene sulfonate along with the more water-soluble sodium salt. This strategy would seem to jeopardize cleaning performance.

U.S. Pat. No. 4,189,395 to Bland claims the use of an acrylic latex emulsion for binding the nonionic detergent mixture within a cleansing pad. The compositions require enormous amounts of acrylic resin that contribute no detergency power to the composition, but instead only binding ability.

U.S. Pat. No. 5,507,968 to Palaikis claims the use of polyacrylamide to bind a detergent composition into a cleansing article to achieve a controlled detergent release. Polyacrylamide is relatively expensive and has no detergency or other benefit to the cleaning.

U.S. Pat. Nos. 6,573,232 and 6,794,353 to Thomas et al. claim use of a cellulosic polymer to "regulate and slow the release of the cleaning composition from the water insoluble substrate", (see Column 8, Lines 24-26 in '232 and Column 8, Lines 42-44 in '353). The disclosure is narrowly limited to mixtures of methyl cellulose and hydroxypropyl methyl cellulose as obtained through the incorporation of various grades of Methocel®, available from Dow Chemical. These materials have historically been used for compounding slow release pharmaceuticals and for conventional rheology modification (i.e., thickening).

Accordingly, there continues to be interest in cleaning articles that are efficient at cleaning and that can be used for several cleaning tasks within a cleaning session before disposal. Also, there is a clear need for improved methods for manufacturing such articles. Substantially dry articles would improve shipping weights and the overall sustainability of products, and would allow extended shelf life and added storage convenience for the consumer.

SUMMARY OF THE INVENTION

The present invention provides a substantially dry, two-sided cleaning article, impregnated with a long-lasting detergent composition. Modified methods of manufacturing allow for application of very concentrated detergent mixtures to the substrate, thus reducing the amount of drying needed to produce the dry article. Compositionally, the present invention is a cleaning article comprising a two-sided nonwoven substrate impregnated with a hard surface cleaning composition minimally including a nonionic surfactant and a microbial-derived polysaccharidic polymer. Unlike the prior art, no "absorbent" core or other "sandwiched" third layer is required to hold and controllably release the cleaning composition over multiple cleaning tasks. The microbial-derived polysaccharidic polymer is believed to form hydrogen bonds to both the nonionic detergent ingredient and the preferred viscose rayon fibers within the substrate to slow the expression of the nonionic surfactant from the substrate.

DETAILED DESCRIPTION OF THE INVENTION

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims. Additionally, though described herein in general terms of a cleaning article comprised of a nonionic/ alkaline detergent composition impregnated within a water-insoluble substrate, other cleaning agents, such as abrasives, bleaches, disinfectants, deodorants, stain treating chemicals, rust/scale removers, and the like, applied to or otherwise adsorbed within the substrate, may likewise fall within the ambit of the present invention. Additionally any sort of non-functional materials added to the compositions or to the substrates to produce uniquely colored, textured, or scented cleaning articles fall within the spirit of the invention. The cleaning article of the present invention may be fastened to a tool, mop or handle of sorts to make scrubbing easier through more leverage or to at least extend the reach of the cleaning article. Furthermore, any particular physical shape and size for the nonwoven substrate described herein falls within the present invention. That is, the cleaning article of the present invention may be of any practical size/shape for use, (e.g., square, rectangular, wave-shaped, star-shaped, disc-shaped, etc.), perhaps perforated to allow for separation into smaller sections, and/or may be of any shape that incorporates a decorative, novel or otherwise recognizable design such as a brand logo, block-letter, and the like. Some sizes and/or custom shapes may be more practical than others for attachment to certain handles and cleaning tools, including mop handles, cleaning wands, sanding blocks, and the like.

That said, the present invention relates to a cleaning article minimally comprising a water-insoluble, two-layer nonwoven substrate impregnated with a detergent composition that minimally comprises a nonionic surfactant and a microbial-derived polysaccharidic polymer. Herein, “impregnation” refers to the soaking and drying of a composition within the fibers of the substrate to give what is referred to herein as a “substantially dry” article. Substantially dry simply refers to a sensorial “dry-to-the-touch” feel and in no way attempts to quantify residual water, particularly the water of hydration, that may remain within the article even after a drying step and even after obtaining what appears to be an article that is dry-to-the-touch. The individual ingredients of the composition may associate with fibers of the substrate to various degrees, for example depending on the nature of the fibers, electrostatic charges or polarities, possibility of hydrogen bonding, etc. Since the substrate for use in the present invention is comprised of two distinct layers of different composition, it is difficult to analyze which substrate layer contains which detergent ingredients or if the distribution of detergent ingredients between the two layers is more random rather than segregated. However, not being bound by a particular structural theory, (e.g., a theory that may be supported by molecular modeling studies, SEM, etc.), it is believed that the multitude of free hydroxyl groups on the microbially-derived polysaccharidic polymer are available to form hydrogen bonds to both the preferred nonionic surfactant in the composition and the preferred viscose rayon fibers within the substrate. That being said, the invention does not turn on having precise knowledge of how the various detergent ingredients may distribute within the fibers of the two layers of the preferred substrate or the degree of hydrogen bonding between components and fibers. What is important is that the detergent composition is dried somewhere within the structure of the two-layered substrate and that this substantially dry article is useful for multiple cleaning tasks before the detergent is fully expressed.

For the present invention, tile impregnation process may be as simple as soaking/wetting the substrate in a detergent solution and then air or heat drying the article. The wetting process may of course be a well-known continual roll-coating process, for example where large rolls of substrate are run through baths of detergent in a Gravure process. However, simpler and perhaps even crude processes such as soaking or dipping will suffice and are within the scope of the present invention. Drying may be as simple as air drying (e.g., allowing the wet substrate to run a distance after wetting) or may involve actual heat drying at elevated temperature (heated rollers, hot forced air, etc.). The available and preferred processes will be described in more detail below.

As mentioned, the present invention is a cleaning article minimally comprising a two-layered nonwoven substrate impregnated with a long-lasting detergent composition having at least a nonionic surfactant and a microbially-derived polysaccharidic polymer, wherein the two layers of the substrate are different. The surprising result is the efficiency of the microbial polysaccharidic polymer in lengthening the availability of the detergent from the nonwoven. As will be discussed thoroughly below, addition of small amounts of microbial polysaccharidic polymer to the detergent composition prior to impregnation within the nonwoven substrate greatly increases the availability of detergent through multiple cleaning tasks.

The Substrate

Herein, the substrate may also be referred to as a “pad” because it is preferable that the cleaning article of the present invention have a measurable thickness, such as from about 1/16 inch up to about 1/2 inch thick. That is, it is not preferred that the substrate be as thin as a household cleaning wipe, nor is it desirable that it be substantially as thick as a sponge (which is not necessarily regarded by consumers as “disposable” after a single cleaning session). Thus the preferred article is somewhere in between such that it is substantial enough for cleaning, yet thin enough to be perceived as disposable after use. The preferred substrate is comprised of two layers, each layer ranging in thickness of from about 1/32 inch to about 1/4 inch. More preferred is that the two-layered substrate for use in the present invention be from about 1/16 to about 5/16 inch in total thickness. Most preferred is that the total thickness of the two-layered pad be around 3/16 of an inch. Although the thickness of each of the two layers may be measurably different, it is preferred that the two layers be substantially similar in thickness.

In accordance with various embodiments of the present invention, a variety of materials may be used to form the two-layered substrate in the present cleaning article. For example, the substrate may be natural based paper, cotton or cellulose materials (e.g. pulp or viscose rayon), entirely synthetic material (e.g. melt-blown, spun-laid, air-laid or carded polypropylene, polyester, or similar synthetic polymer fibers) or combinations of natural and synthetic materials (such as pulp wet-laid onto a nonwoven web, or an entanglement of mixed natural and synthetic fibers). Materials that are found in both the liquid and air filtration and cleaning industries may find use within at least one of the layers for the two-layered substrate. As will be discussed below, the selection of the substrate has been found to be important for the performance of the product, particularly to the longevity of the impregnated detergent once the article is wetted and the detergent expressed. The selection of the substrate affects a number of additional performance variables in the cleaning article. For example, the type of substrate affects; the amount (weight) of detergent loadable on the substrate and dryable therein, the percentage (%) of detergent that is expressed in the first and each of the subsequent cleaning tasks, and lastly, the durability of the article under mechanical abrasion throughout multiple cleaning tasks. Of course, type of substrate may also affect biodegradability, sustainability and consumer perceptions of “environmental friendliness”.

Suitable substrates may be obtained from any number of various water-insoluble nonwoven materials, called "fabrics". Nonwoven fabrics, with their multitude of uses, are well known to those skilled in the textiles ail. Nonwovens are described very thoroughly in "Nonwoven Fabrics: Raw Materials, Manufacture, Applications, Characteristics, Testing Processes", editors W. Albrecht, H. Fuchs and W. Kittelmann, Wiley-VCH Verlag GmbH & Co. KgaA Weinheim, 2003. Such material can be prepared by forming a web of continuous filament and/or staple fibers and optionally bonding these fibers at fiber-to-fiber contact points to provide fabrics with the desired properties. The term "bonded nonwoven fabric" is used to include nonwoven fabrics where a major portion of the fiber-to-fiber bonding is achieved by either thermal fusion of adjacent fibers, or adhesive bonding that is accomplished through incorporation of adhesives in the web to "glue" fibers together, or by other bonding such as obtained by the use of liquid or gaseous bonding agents (usually in conjunction with heating) to render the fibers cohesive. Chemical bonding may be accomplished through the use of adhesive or latex powders dispersed between the fibers in the web, which is then activated by heat, ultraviolet or infrared radiation, or other suitable activation method. Thermally and chemically bonded carded webs are described in U.S. Pat. No. 6,689,242 to Bodaghi, the subject matter of which is incorporated herein. Thermally and/or chemically bonded nonwovens may be used as the substrates within the present invention. Powder bonding is a dry process that starts with the carding of staple fibers to form a fibrous web, which is then treated with powdered thermal plastic adhesive or latex materials and subjected to a series of ovens and calendar rolls to produce the nonwoven.

Nonwovens may also comprise fibers known as "bi-component fibers", for example "sheath/core bi-component fibers", which are fibers having an outer sheath area or layer with a lower melting point than the inner core area, allowing for efficient and controlled thermal bonding through melting of just the outer layer of each fiber. That is, the outer surface of a bi-component fiber can be made to have a lower melting point than the core of the fiber. For example, binder bi-component fibers where one component has adhesive properties under bonding conditions are widely employed to provide integrity to fibrous webs used as absorbents in personal care products or in filtration products. Additionally, multi-component fibers are similarly known and commercially incorporated into nonwovens. Examples of Such multi-component fibers are described in U.S. Pat. Nos. 5,382,400 (Pike et al.) and U.S. Pat. No. 5,866,488 (Terada et al.) and incorporated herein in their entireties.

During the bonding of the fibers, the web may be simultaneously subjected to mechanical compression to obtain the desired bonding, weights and thicknesses in a process known as "thermal compression bonding". Thermal compression bonding may be accomplished by using a hot embossing roll and a heat flat calendar roll, and incorporating a method in which a heat treating machine such as a hot blast-circulating type, a hot through-air type, an infrared heater type or a vertical hot blast-blowing type is used to carry out thermal compression bonding. Mechanical compression may be used to set the loft or thickness of fabrics with similar basis weights. Normally, increasing the basis weight, or the mass per square area increases thickness, and increasing bonding and compression, decreases loft. Nonwovens may be constructed by laminating together two or more carded webs of fibers, the net result being a thicker nonwoven wherein it is difficult to discern layers. Herein it is preferred to needle-punch together fibrous layers to make thicker layers and then to needle-punch together two separately made layers that are compositionally different. In this manner, the two-layers that comprise the preferred "two-layered" or "two-sided" substrate for use herein will not only be distinguishable from each other, but may also be peeled/teased apart from each other.

Nonwoven webs may be formed from a number of processes, for example, melt-blown, spun-bonded or spun-laid, toe-opened, wet-laid, air-laid, carded, and high pressure hydro-entangled. The basis weight of nonwoven webs is usually expressed in ounces of material per square yard (osy) or grams per square meter (gsm) and the fiber diameters are usually expressed in microns, or in the case of staple fibers, "denier". Denier is defined as grams per 9000 meters of fiber length. For a fiber having circular cross-section, denier may be calculated as fiber diameter in microns squared, multiplied by the density in grams/cc, multiplied by 0.00707. A lower denier indicates a finer fiber and a higher denier indicates a thicker or heavier fiber. The "mean fiber denier" is the sum of tile deniers for each fiber, divided by the number of fibers. A distribution of deniers or an "average fiber denier" refers to a distribution of fiber diameters around a specific value. As used herein, the term "bulk density" refers to the weight of a material per unit of volume and usually is expressed in units of mass per unit of bulk volume (e.g., grams per cubic centimeter). Nonwovens may be produced by fibers having a single average value of diameters or denier, or two or more average value diameter fibers may be used together. For example, two or more distributions of fiber deniers may be combined into separate fiber webs (2½ denier and 4 denier fibers carded together for example). Then separate fiber webs may be laminated together. For example, a single nonwoven may comprise 2½, 4, 6, and 15 denier fibers, meaning it was constructed with four separate denier fibers (four separate average diameters of fibers).

"Spun-bonded fibers" refers to fibers formed by extrusion of molten thermoplastic material as filaments, described for example in U.S. Pat. Nos. 4,340,563 to Appel; U.S. Pat. No. 3,692,618 to Dorschner; U.S. Pat. No. 3,802,817 to Matsuki; U.S. Pat. No. 3,338,992 and U.S. Pat. No. 3,341,394 to Kinney; U.S. Pat. No. 3,502,763 to Hartman; U.S. Pat. No. 3,542,615 to Dobo; and, U.S. Pat. No. 5,382,400 to Pike, the entire contents of each incorporated herein by reference. Spun-bond fibers are generally not tacky when they are deposited onto a collecting surface. Spun-bond fibers are generally continuous and have average diameter from about 7 microns to about 60 microns, and most often between about 15 and 25 microns.

"Melt-blown" refers to fibers formed by extruding molten thermoplastic material through a plurality of fine, normally circular, die capillaries as molten threads or filaments into converging high velocity, usually hot, gas/air streams that attenuate the filaments of molten thermoplastic material to reduce their diameter, which may end up to be down to micro-fiber diameter. Thereafter, the melt-blown fibers are carried by tile high velocity gas stream and are deposited on a collecting surface to form a web of randomly dispersed fibers. Such a process is disclosed, for example, in U.S. Pat. No. 3,849,241 (Butin et al.). Melt-blown fibers are micro-fibers that may be continuous or discontinuous, and are generally smaller than 10 microns in average diameter, and are generally tacky when deposited onto a collecting surface.

"Air-laid" is a well-known process by which a fibrous nonwoven layer can be formed. In the air-laid process, bundles of small fibers having typical lengths of from about 3 to about 52 millimeters are separated and entrained in an air supply and deposited onto a forming screen, usually with the assistance of a vacuum. The randomly deposited fibers then are bonded to one another using, for example, hot air to activate a binder component or latex adhesive. The air-laying process is taught in, for example, U.S. Pat. Nos. 4,640,810 to Laursen and U.S. Pat. No. 5,885,516 to Christensen.

Each of the layers of the preferred two-layer nonwoven used in the present invention may be comprised of carded, cross-lapped fibers that are subsequently needle-punched, thermally bonded, or powder/thermally bonded to form a layer of nonwoven that is ultimately from about 1/32 inch to about 1/4 inch in thickness. Cross-lapping and needle-punching is a simple way to make thicker layers from thin carded layers of fibers without any thermal processes. The resulting non-woven layers may then be combined either thermally or by needle-punching. The preferred non-woven substrate for use in the present cleaning article is comprised of two separate layers of different nonwoven material, each formed from carded, cross-lapped and needlepunched fibers, wherein the two separate layers are then needlepunched together to form the completed two-layer substrate.

The preferred fibers incorporated in either of the two layers of the nonwoven used in the present invention may be single-, bi- (e.g., sheath/core), or multi-component fibers, made from; poly-olefins such as polypropylene, polyethylene; various polyesters such as poly(ethylene terephthalate)-PET, poly (butylene terephthalate)-PBT or poly(trimethylene terephthalate)-PTT, polycarbonates, or polybutyrates and tile like; viscose rayon; various polyamides such as nylons; polyacrylates; and, modacrylics, and mixtures of these types of polymers. Preferred for use in the present invention is a two-layered nonwoven, wherein at least one of the layers comprises some viscose rayon fibers. More preferred is a two-layered nonwoven wherein both layers comprise a poly-olefin yet only one of the two layers includes viscose rayon fibers. Most preferred is to use a two-layered nonwoven substrate having a first layer comprising carded and needle-punched polypropylene and polyester fibers and a second layer comprising carded and needle-punched polypropylene, polyester, and viscose rayon fibers, wherein each of these two compositionally different layers are needle punched together to form a single pad with two visibly distinct layers.

The preferred deniers for the fibers that may be used in either or both of the individual layers of the nonwoven pad are as follows; poly-olefin fibers preferably about 4-7 denier; polyester fibers preferably about 2-16 denier; and, viscose rayon fibers preferably about 2-4 denier. More preferred is to use a first layer comprising about 50-70% poly-olefin fibers and about 30-50% polyester fibers, and a second layer comprising about 35-45% poly-olefin fibers, about 25-35% polyester fibers and about 15-25% viscose rayon fibers. Even more preferred is to use a first layer comprising about 50-70% poly-olefin fibers and about 30-50% polyester fibers, and a second layer comprising about 45-55% poly-olefin fibers, 25-35% polyester fibers, and 25-35% viscose rayon fibers, wherein the first and second layers are needle-punched together to form a distinct two-layered pad. Preferably the poly-olefin is polyethylene, polypropylene or polybutylene, and the polyester is poly-(ethylenle tereplithalate) or poly-(butylene terephthalate) or poly-(trimethiylenie terephthalate), (i.e., PET, PBT or PTT). The basis weight of the two-layered substrate when finished is preferably from about 5 to about 15 osy and most preferably around 10 osy, such that each 3 in×5 in piece of two-layered substrate (without any detergent) weighs from about 2.5 to about 5 grams and most preferably from about 3 to about 4 grams. Most preferred is to use a first layer comprising about 50-70% poly-olefin fibers of about 2-8 denier and about 30-50% polyester fibers of about 12-18 denier, and a second layer comprising about 45-55% poly-olefin fibers of about 2-8 denier, 25-35% polyester fibers of about 1-5 denier, and 25-35% viscose rayon fibers of about 1-5 denier, wherein the first and second layers are needle-punched together to forii a distinct two-layered pad. It is most preferred to incorporate viscose rayon fibers in only one layer, and although polyester is preferred in both layers, it is most preferred to use the larger denier polyester (12-18) in the layer without the viscose rayon fibers and the smaller denier (1-5) in the layer with the viscose rayon.

The dimensions of the above substrate cut for use in the article of the present invention should create a size suitable for easy handling, for example in the range of from about 4 square inches to about 64 square inches and most preferably around 10-20 square inches. However, pads of other dimensions may be useful for other cleaning markets. Of course, the article need not be square, rectangular or really any particular shape and may comprise other shapes such as polyhedral, rhomboidal, round, oval, hand, heart, or other novel decorative shape, or may comprise a shape that helps to identify a particular brand and promote repeat purchase, (e.g., a shape that connotes a particular trademark). The substrate for use in the present invention may be colored in any color (even vivid colors for example), or may be substantially white, and may be textured from heated rollers that are patterned. For example, the poly-olefin fibers that may be used in one or both of the carded layers may be white or may be colored, whereas the polyester and viscose rayon fibers may be white. One particular and preferred combination of these white and colored fibers may result in a two-layered pad with contrasting white and colored layers. Most preferred is to use a two-layered pad comprising a first colored layer (e.g. blue color) as obtained by incorporating blue poly-olefin fibers and a second substantially white colored layer as obtained by incorporating white poly-olefin, polyester and viscose rayon fibers.

Of particular use in the present invention is a flamed or otherwise heat-singed side to the article to communicate a "scrubbing side" to the consumer. Singing plastic nonwoven fibers to create "roughness" on a nonwoven pad is well known in the art and may be accomplished by a flame or by application of directed heat. For example, U.S. Pat. No. 6,551,980 to Wisniewski et al. describes a pad having a polypropylene layer that is flame treated to further increase the level of abrasiveness. The '980 patent is incorporated herein in its entirety by reference. For the two-layered substrate of use herein, it is most preferred to flame the layer that comprises the preferred poly-olefin and polyester fibers and not to flame the layer that includes the viscose rayon fibers. In this way, the two-sided article will preferably have a rougher, scrubbing first side and a softer, more absorbent second, opposite side. Most preferred is to use a two colored article (colored poly-olefin/polyester first layer needle-punched to a white poly-olefin/polyester/viscose rayon second layer) as mentioned and to flame the colored side. In this way the consumer will know to use the article of the present invention much like the two-layered sponges currently in the market that feature a darkly colored "no-scratch" scrubbing side and a lighter colored or white absorbent layer. Most preferred is to use a blue to violet color for either or both of poly-olefin and polyester fibers used in the singed/scrubbing side because this is a consumer recognizable color for "no-scratch" scrubbing sponges.

The cleaning article of the present invention may have one or more perforations so that it can be divided into two or more equal or unequal parts. In this way the consumer can customize the size of tile article for the cleaning tasks at hand. The perforations may already be on the two-layered nonwoven substrate before impregnation with detergent, or may be added after applying the composition to the substrate. Or, the articles may be individually cut from larger rolls of nonwoven with perforations made concurrent to cutting the nonwoven to size. The perforations may enhance interaction with tie product by allowing the consumer to tear out decorative elements along perforations. For example, the cleaning article may be in the shape of letters that spell out a brand name, whereby the consumer may break off various letters from the name to create smaller cleaning articles. The removed sections of the product may be used for other cleaning tasks around the home.

To produce the cleaning article of the present invention, the water-insoluble two-layer nonwoven substrate is impregnated with a liquid detergent composition by any suitable method known in the fabric coatings industry. For example, the substrate may be coated by a simple spray or flow of liquid detergent mixture, or by dipping or soaking. In a slot coating process, the fluid to be coated is forced under pressure through a thin slot of a given width and length. The mass rate of application (gm/second) is controlled by both application pressure and slot size. The substrate is coated as it is drawn past the slot (for example at 1-100 feet per minute). Depending upon the scale of manufacture, representative slot-coating dies include UltraCoat®, AcuFlow®, UltraFlow® products from Extrusion Dies Industries LLC (EDI), Wayne Yellow Jacket® Flexible Lip Flat Dies, or Liberty Die Coating Equipment. The physical form of the detergent compositions applied to the nonwoven substrate may be anything from "water-thin" to viscous liquids, slurries or pastes, or even molten waxy detergent materials that subsequently solidify within the interstices of the fibers upon cooling.

General roll coating methods are preferred for wetting the nonwoven substrate with the detergent composition and these include, but are not limited to: Knife-Over-Roll, Knife-Over-Blanket, Knife-Over-Gap, Gravure, Reverse Roll, Meyer Rod, Differential Roll, Saturation, or Dip/Immersion, or Kiss Coating (Lick Roll).

It should be understood that the scope of the present invention includes the application of any of the described detergent compositions in stages to the two-layered substrate. For example, one or more of the ingredients may be left out of the detergent composition and applied separately to the nonwoven (for example, to pre-condition the substrate). Then the remaining ingredients of the detergent composition may be applied to the substrate in a second operation.

The Detergent Composition

The detergent composition applied to the two-layered nonwoven substrate minimally includes a nonionic surfactant and a microbially-derived polysaccharidic polymer. Optionally, the detergent composition may also include one or more anionic surfactants, additional nonionic surfactants, builders, chelants, bleaches, and miscellaneous adjuvant such as dyes, pigments, fragrances (in various forms), preservatives, and the like. The remainder of the detergent prior to coating and drying necessarily comprises a carrier, wherein the preferred carrier is water or a mixture of water and various co-solvents (alcohol, glycol ethers and the like). When the previously wetted substrate is air or heat dried, it is expected that the majority of the carrier will be vaporized off, leaving behind the active ingredients dried within the substrate such that the finished article is "dry-to-the-touch". It may be important to drive out most of the free water from the article so that it will store for longer periods of time without proliferating bacteria and mold growth (water activity will be discussed below). However, it is expected that even after drying some level of hydration remains even though the article may appear and feel "dry".

The preferred liquid detergent compositions used to wet the substrates are designated as "4×" and "5×" variants, with these designations meaning approximately how concentrated the mixtures are. It is preferable to use very concentrated detergent mixtures (e.g. the "5×" version, which has very low water content) so that drying times are reduced and/or no heat is required, and so that more active detergent (by weight) can be incorporated into the pad yet still be able to achieve a substantially dry article. Diluted versions of the detergent composition, resembling ready-to-use liquid cleaners, are also shown since these may be used for comparative cleaning tests and optimization of the components without the substrate. Weight percentages (wt. %) given within the discussion of the detergent compositions refer to the active percent by weight of that ingredient in the aqueous solution, with the understanding that the liquid composition will then be used to wet the substrate (at a particular loading level) and dried therein. Later, weight percentages of the active ingredients within the dry pad will be shown and discussed.

Surfactant Components

The detergent compositions for application to the substrates of the present invention minimally include one or more nonionic surfactants, optionally enhanced with additional nonionic materials such as fatty alcohols, esters, amides, polyols, polypropylene or polyethylene glycols, and waxes, and the like.

Most preferred for use as the nonionic surfactant are the alkyl polyglycoside surfactants. The alkyl polyglycosides (commonly referred to as APG's), also called alkyl polyglucosides if the saccharide moiety is glucose, are naturally derived, nonionic surfactants. The alkyl polyglycosides that may be used in the present invention are fatty ester derivatives of saccharides or polysaccharides that are formed when a carbohydrate is reacted under acidic conditions with a fatty alcohol through condensation polymerization. The APG's are typically derived from corn-based carbohydrates and fatty alcohols from natural oils found in animals, coconuts and palm kernels. Such methods for deriving APG's are well known in the art. The alkyl polyglycosides that are preferred for use in the present invention contain a hydrophilic group derived from carbohydrates and is composed of one or more anhydroglucose units. Each of the glucose units may have two ether oxygen atoms and three hydroxyl groups, along with a terminal hydroxyl group, which together impart water solubility to the glycoside. The presence of the alkyl carbon chain leads to the hydrophobic tail of the molecule.

When carbohydrate molecules react with fatty alcohol compounds, alkyl polyglycoside molecules are formed having single or multiple anhydroglucose units, which are termed monoglycosides and polyglycosides, respectively. The final alkyl polyglycoside product typically has a distribution of glucose units (i.e., degree of polymerization).

The APG's that may be used in the detergent composition for impregnation into the article of the present invention preferably comprise saccharide or polysaccharide groups (i.e., mono-, di-, tri-, etc. saccharides) of hexose or pentose, and a fatty aliphatic group having 6 to 20 carbon atoms. Preferred alkyl polyglycosides that can be used according to the present invention are represented by the general formula, $G_x\text{-O—}R^1$, wherein G is a moiety derived from reducing saccharide containing 5 or 6 carbon atoms, e.g., pentose or hexose; $R^1$ is fatty alkyl group containing 6 to 20 carbon atoms; and x is the degree of polymerization of the polyglycoside, representing the number of monosaccharide repeating units in the polyglycoside. Generally, x is an integer on the basis of individual molecules, but because there are statistical variations in the manufacturing process for APG's, x may be a non-integer on an average basis when referred to particular APG's of use as an ingredient for the detergent composition of the present invention. For the APG's preferred for use herein, x preferably has a value of less than 2.5, and more preferably is between 1 and 2. Exemplary saccharides from which G can be derived are glucose, fructose, mannose, galactose, talose, gulose, allose, altrose, idose, arabinose, xylose, lyxose and ribose. Because of the ready availability of glucose, glucose is preferred in polyglycosides. The fatty alkyl group is preferably saturated, although unsaturated fatty chains may be used. Generally, the commercially available polyglycosides have $C_8$to $C_{16}$ alkyl chains and an average degree of polymerization of from 1.4 to 1.6.

Commercially available alkyl polyglycoside can be obtained as concentrated aqueous solutions ranging from 50 to 70% actives and are available from Cognis. Most preferred for use in the present compositions are APG's with an average degree of polymerization of from 1.4 to 1.7 and the chain lengths of the aliphatic groups are between $C_8$ and $C_{16}$. For example, one preferred APG for use herein has chain length of $C_8$ and $C_{10}$ (ratio of 45:55) and a degree of polymerization of 1.7. The detergent compositions for use in the present invention have the advantage of being much more environmentally friendly than conventional detergent compositions of petroleum origin. Because of the carbohydrate property and the excellent water solubility characteristics, alkyl polyglycosides are compatible in high caustic and builder formulations. The detergent composition preferably includes a sufficient amount of alkyl polyglycoside surfactant in an amount that provides a desired level of cleaning of soils found on hard surfaces. Preferably, the detergent composition concentrate includes between about 1% and about 70% by weight alkyl polyglycoside sulfactant and more preferably APG® 325N from Coginis at between about 20% and 60% by weight active alkyl polyglucoside surfactant.

Less preferred for use in the cleaning article of the present invention are nonionic surfactants such as the ethoxylated and/or propoxylated primary alcohols having 10 to 18 carbon atoms and on average from 4 to 12 moles of ethylene oxide (EO) and/or from 1 to 10 moles of propylene oxide (PO) per mole of alcohol. Further examples are alcohol ethoxylates containing linear radicals from alcohols of natural origin having 12 to 18 carbon atoms, e.g., from coconut, palm, tallow fatty or oleyl alcohol and on average from 4 to about 12 EO per mole of alcohol. Somewhat useful as a nonionic surfactant in the present invention is the $C_{14}$-$C_{15}$ alcohol ethoxylate-7EO and the $C_{12}$-$C_{14}$ alcohol ethoxylate-12EO incorporated from about 1% to about 70%, for example at a level of from about 1% to about 20%. Nonionic ethoxylate surfactants that may find use herein include for example, Neodol® 45-7, Neodol® 25-9, or Neodol® 25-12 from Shell Chemical Company. Most preferred are Neodol® 45-7, which is a $C_{14}$-$C_{15}$ alcohol ethoxylate-7EO and Surfonic® L24-12, available from Huntsman, which is a $C_{12}$-$C_{14}$ alcohol ethoxylate-12EO surfactant (or the Neodol® 25-12 from Shell which is the petroleum feedstock derived material that is substantially similar in performance). Combinations of more than one alcohol ethoxylate surfactant may also be desired in the detergent composition in order to maximize degreasing of various hard Surfaces. Alcohol ethoxylate nonionic surfactants are preferably incorporated at a level of from about 1% to about 50% by weight and most preferably from about 3% to about 40% by weight in the liquid concentrate composition.

The detergent composition for application to the substrate may also include an amide type nonionic surfactants, for example alkanolamides that are condensates of fatty acids with alkanolamines such as monoethanolamine (MEA), diethanolamine (DEA) and monoisopropanolamine (MIPA), that have found widespread use in cosmetic, personal care, household and industrial formulations. Useful alkanolamides include ethanolamides and/or isopropanolamides such as monoethanolamides, diethanolamides and isopropanolamides in which the fatty acid acyl radical typically contains from 8 to 18 carbon atoms. Especially satisfactory alkanolamides have been mono- and diethanolamides such as those derived from coconut oil mixed fatty acids or special fractions containing, for instance, predominately $C_{12}$ to $C_{14}$ fatty acids. For most applications, alkanolamides prepared from trialkylglycerides are considered most practical due to lower cost, ease of manufacturing and acceptable quality. Of use in this invention are mono- and diethanolamides derived from coconut oil mixed fatty acids, (predominately $C_{12}$ to $C_{14}$ fatty acids), such as those available from McIntyre under the brand name Mackamide®. Most preferred for incorporation into the detergent compositions for the present invention is Mackamide® CMA, which is coconut monoethanolamide available from McIntyre. If used, the amide surfactants are preferably incorporated at a level of from about 1% to about 50% and most preferably from about 3% to about 40% by weight in the liquid concentrate composition.

The detergent composition for impregnation into the substrate may optionally include one or more anionic surfactants to assist with cleaning particulate soils and also to degrease fatty oils from showers and tubs. Suitable anionic surfactants include the sulfonate and sulfate types. Preferred surfactants of the sulfonate type are $C_{9-13}$ alkylbenzenesulfonates, olefinsulfonates, hydroxyalkanesulfonates and disulfonates, as are obtained, for example, from $C_{12-18}$ monoolefins having a terminal or internal double bond by sulfonating with gaseous sulfur trioxide followed by alkaline or acidic hydrolysis of the sulfonation products. Anionic surfactants that may find use in the compositions of the present invention include the alkyl benzene sulfonate salts. Suitable alkyl benzene sulfonates include the sodium, potassium, ammonium, lower alkyl ammonium and lower alkanol ammonium salts of straight or branched-chain alkyl benzene sulfonic acids. Alkyl benzene sulfonic acids useful as precursors for these surfactants include decyl benzene sulfonic acid, undecyl benzene sulfonic acid, dodecyl benzene sulfonic acid, tridecyl benzene sulfonic acid, tetrapropylene benzene sulfonic acid and mixtures thereof. Preferred sulfonic acids, functioning as precursors to the alkyl benzene sulfonates useful for compositions herein, are those in which the alkyl chain is linear and averages about 8 to 16 carbon atoms ($C_8$-$C_{16}$) in length. Examples of commercially available alkyl benzene sulfonic acids useful in the present invention include Calsoft® LAS-99, Calsoft® LPS-99 or Calsoft® TSA-99 marketed by Pilot Chemical. Most preferred for use in the present invention is sodium dodecylbenzene sulfonate, available commercially as the sodium salt of the sulfonic acid, for example Calsoft® F-90, Calsoft® P-85, Calsoft® L-60, Calsoft® L-50, or Calsoft® L-40. Also of use in the present invention are the ammonium salts, lower alkyl ammonium salts and the lower alkanol ammonium salts of linear alkyl benzene sulfonic acid, such as triethanol ammonium linear alkyl benzene sulfonate including Calsoft® T-60 sold by Pilot Chemical. The preferred level of sulfonate surfactant in the present invention is from about 1.0% to about 50%. Most preferred is to use sodium dodecylbenzene suifoniate at a level of from about 3% to about 40%.

Also with respect to the anionic surfactants useful in the detergent composition applied to the substrate herein, the alkyl ether sulfates, also known as alcohol ether sulfates, are preferred. Alcohol ether sulfates are the sulfuric monoesters of the straight chain or branched alcohol ethoxylates and have the general formula R—$(CH_2CH_2O)_x$—$SO_3M$, where R—$(CH_2CH_2O)_x$— preferably comprises $C_7$-$C_{21}$ alcohol ethoxylated with from about 0.5 to about 9 mol of ethylene oxide (x=0.5 to 9 EO), such as $C_{12}$-$C_{18}$ alcohols containing from 0.5 to 9 EO, and where M is alkali metal or ammonium, alkyl ammonium or alkanol ammonium counterion. Preferred alkyl ether sulfates for use in one embodiment of the present invention are $C_8$-$C_{18}$ alcohol ether sulfates with a degree of ethoxylation of from about 0.5 to about 9 ethylene oxide moieties and most preferred are the $C_{12}$-$C_{15}$ alcohol ether sulfates with ethoxylation from about 4 to about 9 ethylene oxide moieties, with 7 ethylene oxide moieties being most preferred. It is understood that when referring to alkyl ether sulfates, these substances are already salts (hence designated "sulfonate"), and most preferred and most readily available are the sodium alkyl ether sulfates (also referred to as NaAES). Commercially available alkyl ether sulfates include the CALFOAM® alcohol ether sulfates from Pilot Chemical, the EMAL®, LEVENOL® and LATEMAL® products from Kao Corporation, and the POLYSTEP® products from Stepan, however most of these have fairly low EO content (e.g., average 3 or 4-EO). Alternatively the alkyl ether sulfates for use in the present invention may be prepared by sulfonation of alcohol ethoxylates (i.e., nonionic surfactants) if the commercial alkyl ether sulfate with the desired chain lengths and EO content are not easily found, but perhaps where the nonionic alcohol ethoxylate starting material may be. For example, sodium lauryl ether sulfate ("sodium laureth sulfate", having about 3 ethylene oxide moieties) is very readily available commercially and quite common in shampoos and detergents, however, this is not the preferred level of ethoxylation for use in the present invention for hard surface cleaning. Therefore it may be more practical to sulfonate a commercially available nonionic surfactant such as Neodol® 25-7 Primary Alcohol Ethoxylate (a $C_{12}$-$C_{15}$/7EO nonionic from Shell) to obtain the $C_{12}$-$C_{15}$/7EO alkyl ether sulfate that may have been difficult to source commercially. The preferred level of $C_{12\text{-}C18}$/0.5-9EO alkyl ether sulfate in the present invention is from about 1% to about 50%. Most preferred is from about 3% to about 40%.

Other anionic surfactants that may be included in the detergent composition herein include the alkyl sulfates, also known as alcohol sulfates. These surfactants have the general formula R—O—$SO_3Na$ where R is from about 10 to 18 carbon atoms, and these materials may also be denoted as sulfuric monoesters of $C_{10}$-$C_{18}$ alcohols, examples being sodium decyl sulfate, sodium palmityl alkyl sulfate, sodium myristyl alkyl sulfate, sodium dodecyl sulfate, sodium tallow alkyl sulfate, sodium coconut alkyl sulfate, and mixtures of these surfactants, or of $C_{10}$-$C_{20}$ oxo alcohols, and those monoesters of secondary alcohols of this chain length. Also useful are the alk(en)yl sulfates of said chain length which contain a synthetic straight-chain alkyl radical prepared on a petrochemical basis, these sulfates possessing degradation properties similar to those of the corresponding compounds based on fatty-chemical raw materials. From a detergents standpoint, $C_{12}$-$C_{16}$-alkyl sulfates, $C_{12}$-$C_{15}$-alkyl sulfates, and also $C_{14}$-$C_{15}$ alkyl sulfates, are all preferred. Most preferred is to use sodium lauryl sulfate from the Stepan Company sold under the trade name of Polystep®. The preferred level of alcohol sulfate in the present invention is from about 1% to about 50%. Most preferred is from about 3% to about 40%.

Fatty soaps may also be incorporated into the detergent composition as an anionic detergent component as these are particularly suitable to aid fat and oil removal from shower/tub/enclosure surfaces. As used here, "fatty soap" means the salts of fatty acids. For example, the fatty soaps that may be used here have general formula R—$CO_2M$, wherein R represents a linear or branched alkyl or alkenyl group having between about 8 and 24 carbons and M represents an alkali metal such as sodium or potassium or ammonium or alkyl- or dialkyl- or trialkyl-ammonium or alkanol-ammonium cation. The fatty acid soaps suitable for emulsifying similar soap residues on bathroom surfaces, is preferably comprised of higher fatty acid soaps. That fatty acids that may be the feed stock to the fatty soaps may be obtained from natural fats and oils, such as those from animal fats and greases and/or from vegetable and seed oils, for example, tallow, hydrogenated tallow, whale oil, fish oil, grease, lard, coconut oil, palm oil, palm kernel oil, olive oil, peanut oil, corn oil, sesame oil, rice bran oil, cottonseed oil, babassu oil, soybean oil, castor oil, and mixtures thereof. Fatty acids can be synthetically prepared, for example, by the oxidation of petroleum, or by hydrogenation of carbon monoxide by the Fischer-Tropsch process. The fatty acids of particular use in the present invention are linear or branched and containing from about 8 to about 24 carbon atoms, preferably from about 10 to about 20 carbon atoms and most preferably from about 14 to about 18 carbon atoms. Preferred fatty acids for use in the present invention are tallow or hydrogenated tallow fatty acids and their preferred salts (soaps) are alkali metal salts, such as sodium and potassium or mixtures thereof. Other useful soaps are ammonium and alkanol-ammonium salts of fatty acids. The fatty acids that may be included in the present compositions will preferably be chosen to have desirable hard surface cleaning efficacy and foam regulation. The preferred level of fatty soap ill the present invention is from about 1% to about 50%. Most preferred is from about 3% to about 40%.

Additional anionic surfactants that may find use in the compositions of the present invention include the alpha-sulfonated alkyl esters of $C_{12}$-$C_{16}$ fatty acids. The alpha-sulfonated alkyl esters may be pure alkyl ester or a blend of (1) a mono-salt of an alpha-sulfonated alkyl ester of a fatty acid having from 8-20 carbon atoms where the alkyl portion forming the ester is straight or branched chain alkyl of 1-6 carbon atoms and (2) a di-salt of an alpha-sulfonated fatty acid, the ratio of mono-salt to di-salt being at least about 2:1. The alpha-sulfonated alkyl esters useful herein are typically prepared by sulfonating an alkyl ester of a fatty acid with a sulfonating agent such as $SO_3$. When prepared in this manner, the alpha-sulfonated alkyl esters normally contain a minor amount, (typically less than 33% by weight), of the di-salt of the alpha-sulfonated fatty acid which results from saponification of the ester. Preferred alpha-sulfonated alkyl esters contain less than about 10% by weight of the di-salt of the corresponding alpha-sulfonated fatty acid.

The alpha-sulfonated alkyl esters, i.e., alkyl ester sulfonate surfactants, include linear esters of $C_6$-$C_{22}$ carboxylic acids that are sulfonated with gaseous $SO_3$. Suitable starting materials preferably include natural fatty substances as derived from tallow, palm oil, etc., rather than from petroleum sources. The preferred alkyl ester sulfonate surfactants, especially for a detergent composition for the present invention, comprise alkyl ester sulfonate surfactants of the structural formula $R^3$—$CH(SO_3M)$—$CO_2R^4$, wherein $R^3$ is a $C_8$-$C_{20}$ hydrocarbon chain preferably naturally derived, $R^4$ is a straight or branched chain $C_1$-$C_6$ alkyl group and M is a cation which forms a water soluble salt with the alkyl ester sulfonate, including sodium, potassium, magnesium, and ammonium cations. Preferably, $R^3$ is $C_{10}$-$C_{16}$ fatty alkyl, and $R^4$ is methyl or ethyl. Most preferred are alpha-sulfonated methyl or ethyl esters of a distribution of fatty acids having an average of from 12 to 16 carbon atoms. For example, the alpha-sulfonated esters Alpha-Step® BBS-45, Alpha-Step® MC-48, and Alpha-Step® PC-48, all available from the Stepan Co. of Northfield, Ill., may find use in the present invention. Alpha-sulfonated fatty acid ester surfactants may be used at a level of from about 1-50% and most preferably at a level of from about 3% to about 40% by weight in the detergent composition, Polymeric Components For increasing the length-of-life of the detergent composition within the nonwoven substrate it has been unexpectedly discovered that microbially-derived polysaccharidic polymers work exceptionally better than conventional rheology modifiers. A number of polysaccharidic polymers are generated by microorganisms. Some examples include alginate, curdlane, dextran, gellan, glucan, pullulan, and xanthan. Xanthan gum is produced as an extracellular product in the fermentation of glucose or sucrose by the bacterium *Xanthomonas campestris*. Since the backbone of xanthan gum consists of two β-D-glucose units linked through the 1 and 4 positions, each monosaccharide unit in the backbone has two free hydroxyl groups (—OH groups). The side chains of the molecule consist of two mannose and one glucuronic acid monosaccharidic units. Some of these mannose units have a pyruvate ester linkage, but nonetheless, considerable numbers of free hydroxyl groups remain in the repeating side chains of the xanthan gum polymer as well as in the backbone. That being said, it appears that such a microbially-derived polysaccharidic polymer as xanthan gum is preferred for extending the life of the detergent in the substrate due to the multitude of free hydroxyl groups available for hydrogen bonding. The most preferred microbially-derived polysaccharidic polymers to be used herein is xanthan gum available from Kelco under the trade name Keltrol RD®, Keizan S® and Keizan T® and Kelzan AR®, or mixtures thereof. It is preferable to incorporate the microbially-derived polysaccharidic polymer at from about 0.5% to about 7.5% by weight in the liquid concentrate composition. Most preferred is to use from about 1% to about 6% by weight of xanthan gum in the concentrated liquid detergent composition.

Chelating Agents

Chelating agents may be incorporated in the detergent compositions herein in amounts ranging from 0.01% to 20% by weight of the total composition, preferably from about 1% to about 15%. Particularly preferred for use herein are amino carboxylate chelants including salicylic acid, aspaitic acid, glutamic acid, glycine, malonic acid, ethylene diamine tetraacetates (EDTA), diethylenie triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanol-diglycines, propylene diamine tetracetic acid (PDTA) and methyl glycine diacetic acid (MGDA), both in their acid form, or in their alkali metal, ammonium, and substituted ammonium salt forms or partial salt forms. Particularly suitable amino carboxylates to be used herein are diethylene triamine penta acetic acid, propylene diamine tetracetic acid (PDTA) which is, for instance, commercially available from BASF under the trade name Trilon FS® and trisodium methyl glycine diacetic acid (MGDA) available from BASF under the trade name Trilon M®.

Other suitable chelating agents for use herein may include alkali metal ethane 1-hydroxy diphosphonates (HEDP), alkylene poly(alkylene phosphonate), as well as amino phosphonate compounds, including amino aminotri(methylene phosphonic acid) (ATMP), nitrilo trimethylene phosphonates (NTP), ethylene diamine tetra methylene phosphonates, and diethylene triamine penta methylene phosphonates (DTPMP). The phosphonate compounds may be present either in their acid form or as salts of different cations on some or all of their acid functionalities. Preferred phosphonate chelating agents to be used herein are diethylene triamine penta methylene phosphonate (DTPMP) and ethane 1-hydroxy diphosphonate (HEDP). Such phosphonate chelating agents are commercially available from Monsanto tinder the trade name DEQUEST®. Any of the above mentioned chelants may be used at from about 1% to about 15% by weight in the liquid detergent composition.

Most preferred is to use trisodium methyl glycine diacetic acid available from BASF under the trade name Trilon M® at from about 5% to about 15% by weight active material in the liquid detergent concentrate.

Builders

The detergent composition applied to the substrate of the present invention may also include a builder. Such builders may include but are not limited to carbonates, bicarbonates, silicates, borates, zeolites, phosphates, citrates, alkali metal hydroxides, and the like at a level of from about 0.1% to about 5% by weight active material. More useful in the present invention is sodium, potassium or magnesium hydroxide, or sodium, potassium or magnesium carbonate. Most preferred is to use sodium hydroxide at from about 0.1% to about 1% by weight in the detergent composition.

An optional silicate builder may comprise a combination of liquid silicate and anhydrous silicate in order to help minimize the amount of water in the detergent composition, (e.g. to improve dry time after application of the detergent composition to the nonwoven substrate). The preferred silicate is an alkali metal silicate salt (the alkali metal salts of silicic acid) with the sodium and potassium silicate salts being the most preferred. The alkali metal silicates that are useful may be in a variety of forms that can be described by the general formula $M_2O:SiO_2$, wherein M represents the alkali metal and in which the ratio of the two oxides varies. Most useful alkali metal silicates will have a $SiO_2/M_2O$ weight ratio of from about 1.6 to about 4. Preferred silicates include the Sodium Silicate Solutions from PQ Corporation, such as A®1647 Sodium Silicate Solution, a 46.8% active solution of sodium silicate having a $SiO_2/Na_2O$ ratio of about 1.6 to about 1.8:1. Also of use in the compositions of the present invention are the potassium silicates, such as the Kasil® products from PQ Corporation. For example, Kasil®l Potassium Silicate Solution is a 29.1% solution of potassium silicate having a $SiO_2/K_2O$ ratio of about 2.5. It is preferable to use either sodium or potassium silicate at a level of from about 0.5% to about 5% in the compositions of the present invention. Also of use is sodium metasilicate and sodium silicate, such as the hydrous sodium silicate Britesil® C24 available from PQ Corporation. It is preferred to incorporate any of these builders at from about 0.1% to about 5% by weight active material in the detergent composition prior to drying on the substrate.

Miscellaneous Adjuvant

The detergent composition preferably includes a fragrance. It is desirable to add a fragrance that can be perceived in the cleaning article after the detergent composition is dried therein, and which emanates from the article when it is wetted by the consumer and used throughout a multiple task cleaning session. This may require; the use of substantive fragrances that have an increased longevity due to the nature of the fragrance components themselves (i.e. less volatile ingredients); the use of a fairly large amount of fragrance (to make up for the amount lost while drying the vetted substrate); and/or, the use of encapsulated fragrance(s), or combinations of these ideas. Since manufacture of the finished article involves a drying step, it is likely that some fragrance will be driven out of the article along with the carrier (water/solvent) from the detergent composition, even by simple air drying. In the simplest embodiment, a fragrance typically used in cleaning compositions (e.g. lemon, orange, pine, floral, mint, etc.) may be incorporated in the detergent mixture at from about 0.1% to about 5% by weight. At this level, some perceivable fragrance is likely to remain after drying of the detergent composition within the nonwoven substrate. Certainly if hot air/heated rollers are used to dry the substrate, it is expected that more fragrance will be lost as compared to the amount of fragrance lost through air drying of the substrate.

Encapsulated fragrances are well known in the art, and are preferred for use in the cleaning article to give the article a longer-lasting fragrance impression (both in dry storage and in wet use). Encapsulation of fragrance has been described in many prior art references, including but not limited to; U.S. Pat. No. 7,338,928 to Lau et al.; U.S. Pat. No. 7,294,612 to Popplewell et al.; U.S. Pat. No. 7,196,049 to Brain et al.; U.S. Pat. No. 7,125,835 to Bennett et al.; U.S. Pat. No. 7,122,512 to Brain et al.; U.S. Pat. No. 7,119,057 to Popplewell et al.; U.S. Pat. No. 6,147,046 to Shefer et al.; U.S. Pat. No. 6,142,398 to Shefer et al.; U.S. Pat. No. 4,446,032 to Munteanu et al.; and, U.S. Pat. No. 4,464,271 to Munteanu, each of which is incorporated herein by reference. Fragrance encapsulation has been optimized and is available through various suppliers, most notably LIPO Technologies, Inc., Vandalia, Ohio, and Alco Chemical, Chattanooga, Tenn., (e.g. using Alcocap® natural polymers for encapsulation). Encapsulation is described thoroughly in "Microencapsulation: Methods and Industrial Applications", Benita (Ed.), Marcel Dekker, Inc., New York, 1996. Fragrance microcapsules obtained from LIPO, Alco, or the fragrance houses, or as obtained through any of these published methods may be incorporated in the detergent compositions herein at from about 0.1% to about 5% by weight in the liquid composition, which is then applied to the substrate and dried to give slow-release fragrance perception from the article. In the dried and finished cleaning article of the present invention, it is preferred to use encapsulated fragrance (microcapsules) at from about 0.1% to about 1.0% by weight in the liquid detergent concentrate.

The detergent composition may also contain a colorant or dyes. Dyes are optional ingredients within the compositions of the present invention since color may be mole effectively incorporated within the fibers of the substrate instead, (i.e., blue colored poly-olefin or polyester fibers as described above). Dyes may comprise pigments, or other colorants, chosen so that they are compatible with the other ingredients in the detergent composition, compatible with the manufacturing process, and not staining to grout, worn vitreous, and other porous surfaces. For example, a preferred colorant for use in the present invention is Liquitint® Green FS (from Milliken), at from about 0.001% to about 0.1% by weight, based on the composition of detergent. Other non-limiting examples of dyes include C.I. Pigment Green #17, C.I. Reactive Green #12, F D & C Green #3, C.I. Acid Blue #80, C.I. Acid Yellow #17, Liquitint® Red MX, F D & C Yellow #5, Liquitint® Violet LS, Fast Turquise GLL, Liquitint® Blue MC, Liquitint® Blue HP, or mixtures thereof, which are also useful in the detergent compositions of the present invention. Higher levels of dyes or pigments may impart a color to the nonwoven substrate when dried down, or may only give a colored cleaning solution as expressed from the cleaning article once wetted by the consumer.

Optional ingredients that may be included in the detergent composition within the substrate include but are not limited to bleaching agents (oxygen or chlorine based such as percarbonates, perborates, N-chloroisocyanurates, and the like), enzymes (such as proteases, amylases, lipases, and cellulases and the like), solvents (methanol, isopropanol, various glycol ethers and the like), cationic surfactants, thickeners, surface modifying polymers (for hydrophilic modification of the hard surfaces for future easier cleaning), emulsifiers, acids, bleach catalysts, enzyme stabilizers, inorganic or organic absorbents, clays, buffering agents, active salts, abrasives, preservatives (Neolone® Kathon® and the like), and anti-foaming agents (silicones and the like).

The Effect of Microbially-Derived Polysaccharidic Polymers

TABLE 1 shows comparative performance data for a number of experimental detergent compositions that were dried onto a two-layered substrate comprising a first layer of polyolefin and polyester fibers and a second layer of poly-olefin, polyester and viscose rayon fibers. Each test pad measured 3 in×5 in and had untreated weights of from about 3.18 grams to about 3.89 grams. Detergent solution loading was at the level indicated (with a target loading of about 1.0 gram detergent solution/pad wet loading). The substrates were then dried to leave about 0.6 g dry detergent actives per each 3 in×5 in pad. This procedure produced a number of dried cleaning articles useful for comparative testing. Each article was tested using a simple laboratory "squeeze test" that gives a relative measure of detergent longevity, also called "length of use". This simple "squeeze test" method is as follows: 1) A bowl is filled with 100 mL of city tap water; 2) The dry/treated cleaning article is run through the water until entire article is saturated; 3) The wetted article is removed, folded into quarters and squeezed one-handed with a medium force grip; 4) Steps 1-3 are repeated with a new bowl of water each time until sudsing is no longer observed; and 5) The "number of squeezes" possible until no more sudsing is recorded. In this manner, the number of squeezes is related to the number of cleaning tasks that may be undertaken before the detergent is entirely expressed from the substrate. Typical "length of use" values for the cleaning articles of the present invention are between about 4 and 18 squeezes. Preferably the articles of the present invention will show from about 12 to about 17 total squeezes before the detergent suds are no longer observable.

TABLE 1

| Performance Data | | | | | | | |
|---|---|---|---|---|---|---|---|
| | DETERGENT COMPOSITION/ARTICLE | | | | | | |
| Ingredients | 1 | 2 | 3 | 4 | 5 | 6 | 7 |
| Alkyl polyglucoside (APG-325N) | 38.8 | 38.8 | 38.8 | | | | |
| $C_{12}$-$C_{15}$ Fatty Alcohol Ethoxylate-12EO | | | | 38.8 | 38.8 | | |
| $C_{12}$-$C_{15}$ Fatty Alcohol Ethoxylate-8EO | | | | | | 38.8 | 38.8 |
| Microbial polysaccharidic polymer | 4.8a | | | | 4.8a | | 4.8a |
| Cellulosic polymer | | | 4.8b | | | | |
| Methyl glycine diacetic acid, trisodium salt | 11.6 | 11.6 | 11.6 | 11.6 | 11.6 | 11.6 | 11.6 |
| NaOH | 0.5 | 0.5 | 0.5 | 0.5 | 0.5 | 0.5 | 0.5 |
| Dyes and fragrances | 0.3 | 0.3 | 0.3 | 0.3 | 0.3 | 0.3 | 0.3 |
| Water | 44.0 | 48.8 | 44.0 | 48.8 | 44.0 | 48.8 | 44.0 |
| Loading onto substrate (approx. wet loading/pad) | 1 g/pad | 1 g/pad | 1 g/pad | 1 g/pad | 1 g/pad | 1 g/pad | 1 g/pad |
| Load on substrates after air drying (g/pad) | 0.6 g | 0.6 g | 0.6 g | 0.6 g | 0.6 g | 0.6 g | 0.6 g |
| Replicates run on dried articles | 10 | 5 | 5 | 5 | 5 | 5 | 5 |
| Performance (avg. #squeezes in squeeze test) | 17.3 | 5.0 | 10.2 | 8.6 | 15.2 | 4.2 | 12.0 |
| Standard Deviation | 0.67 | 0 | 0.45 | 0.55 | 0.84 | 0.45 | 0.71 |

KEY:
a= xanthan gum;
b= carboxymethylcellulose (CMC)

The results in TABLE 1 highlight the remarkable and unexpectedly high detergency longevity obtained from the combination of alkylpolyglycoside and microbial polysaccharidic polymer such as xanthan gum, on a pad comprising some viscose rayon fibers. This longevity is not seen when using a conventional cellulosic thickener such as CMC. Comparing Articles 1, 2 and 3 above, for a system with APG surfactant on pad with viscose fibers, it can be seen that xanthan gum increases the suds expression by 246% (Article 1 versus 2), yet CMC only increases the expression by 104% (Article 3 versus 2). In other words, the APG/viscose system will provide about 5 squeezes of suds expression without any polymer present, and this number can be increased to about 17.3 squeezes with xanthan gum, but only to about 10.2 squeezes with CMC. Clearly there is an unexpected difference between using xanthan gun and CMC for improving suds longevity from a nonwoven pad.

Furthermore, when using $C_{12-15}$/12EO alcohol ethoxylate as the nonionic surfactant, addition of xanthan gum increases suds longevity by 77% (comparing the increase from 8.6 to 15.2 squeezes when moving from Article 4 to Article 5), whereas when using APG as the nonionic surfactant, xanthan gum increases suds expression by 246% (comparing the increase from 5 to 17.3 squeezes when moving from Article 2 to Article 1). Based on these results, we believe that xanthan gum, APG surfactant, and the viscose polymer in the substrate combine as a unique combination that form hydrogen bonded layers that can slow the release of the surfactant from the viscose.

That being said, TABLE 2 shows a preferred embodiment of the finished cleaning article of the present invention along with two liquid detergent compositions that may be dried within the substrate to obtain the same preferred final cleaning article. As mentioned, various concentrations of liquid detergent may be used to initially treat the nonwoven substrate, and these are indicated as "4×" and "5×" formulas in TABLE 2. These two concentrates were based on the formula marked "ready-to-use cleaner", which gave superior cleaning performance on tile surfaces. The "5×" formula is the most useful for absorbing into the nonwoven substrate and is most preferred in a commercial manufacturing setting. It is sheer-thinning and can be handled with plant-scale machinery. It is difficult to handle "5×" in a laboratory setting due to its viscosity. The "4×" formula is useful for saturating nonwoven pads in the laboratory setting or in the manufacturing setting. Obviously the more concentrated the detergent solution is, the more useful it is for impregnating into the nonwoven in commercial manufacturing since there is less drying required to get to the finished pad. Indeed, when using the "5×" composition, only air drying is required in a manufacturing setting to achieve substantially dry cleaning articles ready for packaging.

The finished pads in TABLE 2 are shown to have "approximately zero" (~0%) water remaining after drying. It is not expected that all water of hydration is removed from the nonwoven substrate in a conventional air-drying process, even if the finished articles are dry-to-the-touch. It is however preferred to reduce the "Water Activity" below about 0.8 so that the finished dry pads will store well and not grow mold. Water Activity ($a_w$) is the vapor pressure of water above the substrate divided by the vapor pressure of pure water at the same temperature. Water Activity is more commonly found in the food industry as a measure of food dryness. Excessive baking of the wetted substrate has the potential to degrade the organic materials, drive off excessive amounts of fragrance, discolor the white fibers in the pad, and leave behind "off-odors". As is conventional in the wipes industry (and required when showing formulas for disinfecting wipes), the finished cleaning article is shown with the nonwoven as an "ingredient", having its own weight percent in relationship to the other ingredients that comprise the finished pad.

TABLE 2

| Cleaning Article and Detergent Solutions for Impregnating Such | | | | | |
|---|---|---|---|---|---|
| Ingredients* | Ready to Use Cleaner | "4X" Impregnating solution | "5X" Impregnating solution | Cleaning Article** (treated, wet) | Finished Cleaning Article** |
| PP/PE/VC; PP/PE two-layer nonwoven | — | — | — | 79.21 | 86.61 |
| Deionized Water | 86.3 | 51.5 | 41.021 | 8.53 | ~0 |
| Alkyl polyglucoside (APG-325N) | 8.0 | 32.0 | 38.800 | 8.07 | 8.81 |
| Microbial polysaccharidic Xanthan Gum | 2.0 | 4.0 | 4.850 | 1.01 | 1.10 |
| Methyl glycine diacetic acid, $Na_3$ salt | 2.4 | 9.6 | 11.640 | 2.42 | 2.64 |
| NaOH | 0.1 | 0.4 | 0.485 | 0.10 | 0.11 |
| Fragrance | 1.2 | 2.5 | 2.500 | 0.52 | 0.57 |
| Fragrance Microcapsules | — | — | 0.704 | 0.15 | 0.16 |
| Total | 100 | 100 | 100 | 100 | 100 |

*Ingredients are in weight percent (wt. %).

**Active weights with substrate are based on average substrate weights or 3.86 g for a 3 × 5 inch pad and an average loading of the "5X" solution at 1.013 g per pad.

Example Commercial Processing Description:

One process to apply the detergent solution (such as "5×" in TABLE 2) to the preferred substrate uses a Gravure/Kiss type of application where the nonwoven is passed over a rotating cylinder that has been coated with the liquid detergent composition. The cylinder is partially submerged in a heated trough of detergent blend and rotates to coat itself and thereby transfer the detergent to the nonwoven. A liquid detergent loading weight of from about 75 to about 100 grains per square yard can be achieved when process parameters are: Kiss Roll speed 5-10 rpm; Substrate Roll speed 15-25 rpm; and, Trough Temperature 105° F.-115° F. Preferably the detergent concentrate is applied at from about 78 to about 95 grams wet weight per square yard of the two-layered substrate, or from about 0.9 to about 1.1 grams wet weight per each 15 square inches of substrate area (the area of a 3 in×5 in cleaning article). The wetted substrate then simply air dries as it traverses between the Gravure coating and the cutting/packaging station.

Herein we have described substantially dry, two-layered, water-activated cleaning articles that the consumer wets prior to use, which shows unusual suds longevity during multiple uses. The combination of alkyl polyglycoside surfactant and microbially-derived polysaccharidic polymer dried in a nonwoven comprising some viscose fibers leads to an unexpectedly slow release of detergent in use. The most preferred article described comprises a two-layer cleaning article further comprising; a first layer of poly-olefin and polyester fibers; a second layer of poly-olefin, polyester and viscose rayon fibers; and, a detergent composition minimally comprising a nonionic surfactant and a microbially-derived polysaccharidic polymer, wherein the first layer of the article is flamed to produce abrasiveness.

We claim:

1. A water-activated cleaning article comprising:

a. a two-layered nonwoven substrate further comprising a first layer and a second layer, said layers having differing fiber composition, said first layer consisting essentially of carded polypropylene fibers and polyester fibers, said second layer consisting essentially of carded polypropylene fibers, polyester fibers, and viscose rayon fibers, said two-layered substrate having dry basis weight of from about 8 ounces per square yard to about 15 ounces per square yard; and, b. a detergent composition comprising a nonionic surfactant and a microbially-derived polysaccharidic polymer, said composition dried within said substrate, wherein said cleaning article is substantially dry-to-the-touch.

2. The article of claim 1, wherein said first layer is heat-singed to created abrasiveness.

3. The article of claim 1, wherein said first and second layers are needle-punched together and wherein said two-layered nonwoven substrate has a total thickness of from about 1/16 of an inch to about ½ of an inch.

4. The article of claim 1, wherein said polypropylene fibers in both said first layer and said second layer have an average denier of from about 2 to about 8.

5. The article of claim 1, wherein said polyester fibers are selected from the group consisting of poly-(ethylene terephthalate), poly-(butylene terephthalate), and poly-(trimethylene terephthalate), and mixtures thereof.

6. The article of claim 1, wherein said polyester fibers in said first layer have an average denier of from about 12 to about 18 and said polyester fibers in said second layer have an average denier of from about 1 to about 5.

7. The article of claim 1, wherein said nonionic surfactant is chosen from the group consisting of alkyl polyglycosides, alcohol ethoxylates, and fatty acid alkanolamides, and mixtures thereof.

8. The article of claim 1, wherein said microbially derived polysaccharidic polymer is chosen from the group consisting of alginate, curdlane, dextran, gellan, glucan, pullulan, and xanthan gum, and mixtures thereof.

9. The article of claim 8, wherein said microbially derived polysaccharidic polymer is xanthan gum.

10. The article of claim 1 further including an anionic surfactant chosen from the group consisting of alkyl sulfates, alkyl ether sulfates, alkyl benzene sulfonates, alpha-sulfonated fatty acid esters, and fatty acid soaps, and mixtures thereof.

11. The article of claim 1, wherein said detergent composition further includes at least one builder selected from the group consisting of silicates, hydroxides, carbonates, and bicarbonates, and mixtures thereof.

12. The article of claim 1, wherein said detergent composition further includes a chelant selecting from the group consisting of ethylenediamine tetraacetate salts, nitrilotriacetate salts, and methyl glycine diacetic acid salts, and mixtures thereof.

13. The article of claim 1, wherein said cleaning article further includes miscellaneous adjuvant selected from the group consisting of dyes, pigments, fragrance, encapsulated fragrance, preservatives, and bleaching agents, and mixtures thereof.

14. The article of claim 1 further comprising a perforation across either the length or the width of said article.

15. A water-activated cleaning article comprising:

a. a nonwoven pad consisting of a first layer and a second layer of differing fiber composition, said first layer consisting essentially of carded polypropylene fibers having average denier of from about 2 to about 8 and polyester fibers having average denier of from about 12 to about 18, said second layer consisting essentially of carded polypropylene fibers having average denier of from about 2 to about 8, polyester fibers having average denier of from about 1 to about 5, and viscose rayon fibers having average denier of from about 1 to about 5 denier, said first and second layers needlepunched together, said pad having total dry basis weight of from about 8 ounces per square yard to about 15 ounces per square yard; and, b. a detergent composition comprising from about 20% to about 60% of an alkyl polyglucoside and from about 1% to about 6% of xanthan gum, said composition dried within said substrate to a water activity below about 0.8; and, wherein said article is substantially dry-to-the-touch.

* * * * *